No. 777,227. PATENTED DEC. 13, 1904.
T. L. & T. J. STURTEVANT.
CRUSHING MACHINE.
APPLICATION FILED OCT. 6, 1902.
NO MODEL. 7 SHEETS—SHEET 1.

Witnesses:
Edwin T Luce
William B. Wolfendale

Inventors:
Thomas L. Sturtevant,
Thomas J. Sturtevant,
by Henry Calver Atty.

No. 777,227. PATENTED DEC. 13, 1904.
T. L. & T. J. STURTEVANT.
CRUSHING MACHINE.
APPLICATION FILED OCT. 6, 1902.
NO MODEL. 7 SHEETS—SHEET 3.

Witnesses:
Edwin P Luce
William B. Wolfendale

Inventors:
Thomas L. Sturtevant,
Thomas J. Sturtevant,
by Henry Calver, Atty.

No. 777,227. PATENTED DEC. 13, 1904.
T. L. & T. J. STURTEVANT.
CRUSHING MACHINE.
APPLICATION FILED OCT. 6, 1902.
NO MODEL. 7 SHEETS—SHEET 4.
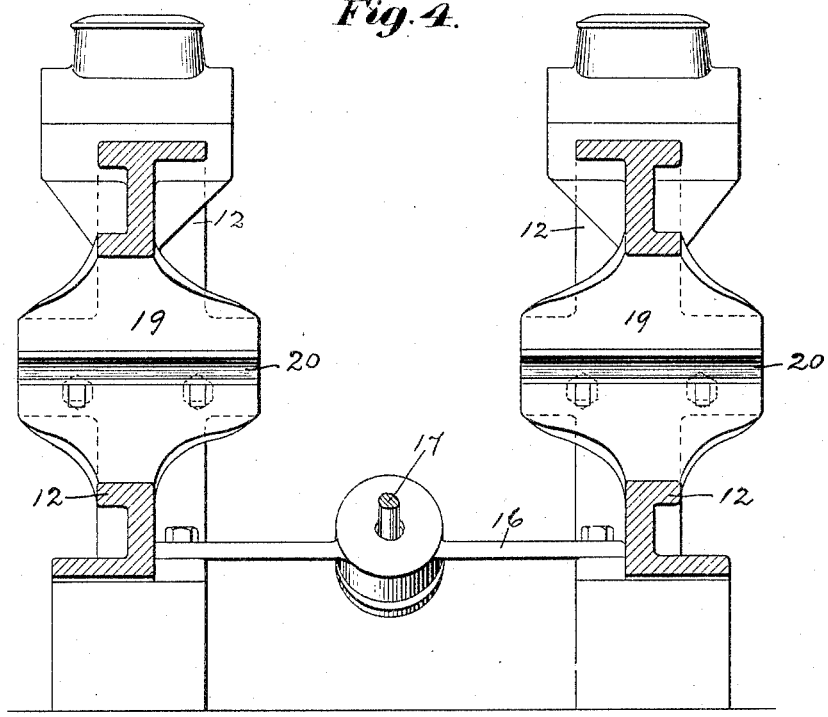
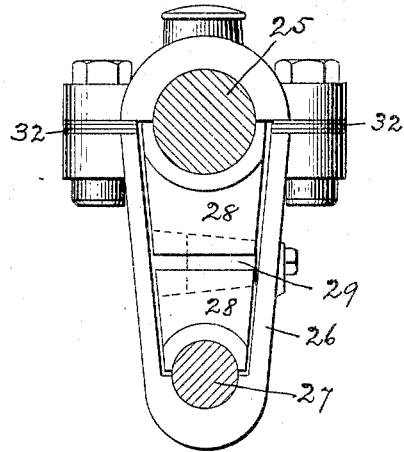

No. 777,227. PATENTED DEC. 13, 1904.
T. L. & T. J. STURTEVANT.
CRUSHING MACHINE.
APPLICATION FILED OCT. 6, 1902.
NO MODEL. 7 SHEETS—SHEET 6.

Witnesses:
Edwin T Luce
William B. Wolfendale

Inventors:
Thomas L. Sturtevant,
Thomas J. Sturtevant,
by Henry Calvert, Atty.

No. 777,227. PATENTED DEC. 13, 1904.
T. L. & T. J. STURTEVANT.
CRUSHING MACHINE.
APPLICATION FILED OCT. 6, 1902.
NO MODEL. 7 SHEETS—SHEET 7.

WITNESSES:
Wm F. Doyle.
Arthur W. Calvert.

INVENTORS:
Thomas L. Sturtevant
Thomas J. Sturtevant
BY
Henry Calver
Attorney.

No. 777,227.　　　　　　　　　　　　　　　　　　　　　Patented December 13, 1904.

UNITED STATES PATENT OFFICE.

THOMAS L. STURTEVANT, OF QUINCY, AND THOMAS JOSEPH STURTEVANT, OF NEWTON CENTER, MASSACHUSETTS, ASSIGNORS TO STURTEVANT MILL COMPANY, OF PORTLAND, MAINE, AND BOSTON, MASSACHUSETTS, A CORPORATION OF MAINE.

CRUSHING-MACHINE.

SPECIFICATION forming part of Letters Patent No. 777,227, dated December 13, 1904.

Application filed October 6, 1902. Serial No. 126,170. (No model.)

*To all whom it may concern:*

Be it known that we, THOMAS L. STURTEVANT, residing at Quincy, in the county of Norfolk, and THOMAS JOSEPH STURTEVANT, residing at Newton Center, in the county of Middlesex, State of Massachusetts, citizens of the United States, have invented certain new and useful Improvements in Crushing-Machines, of which the following is a specification, reference being had therein to the accompanying drawings.

This invention relates to that class of machines for reducing ores, stones, and other hard substances of the same general character as those embraced by our United States Patents No. 588,618, of August 24, 1897, and No. 607,575, of July 19, 1898, and in which the material to be reduced is crushed between a stationary or anvil jaw and a movable jaw cooperating therewith and having a rolling or rocking movement relative to the stationary jaw, so that the material is crushed by the rolling or rocking action of the movable jaw.

The present invention relates to certain improvements by which the weight of the machines is very considerably reduced without impairing their efficiency and also to certain features by which the efficiency and durability of the machines are increased without increasing the cost of construction.

Figure 1:
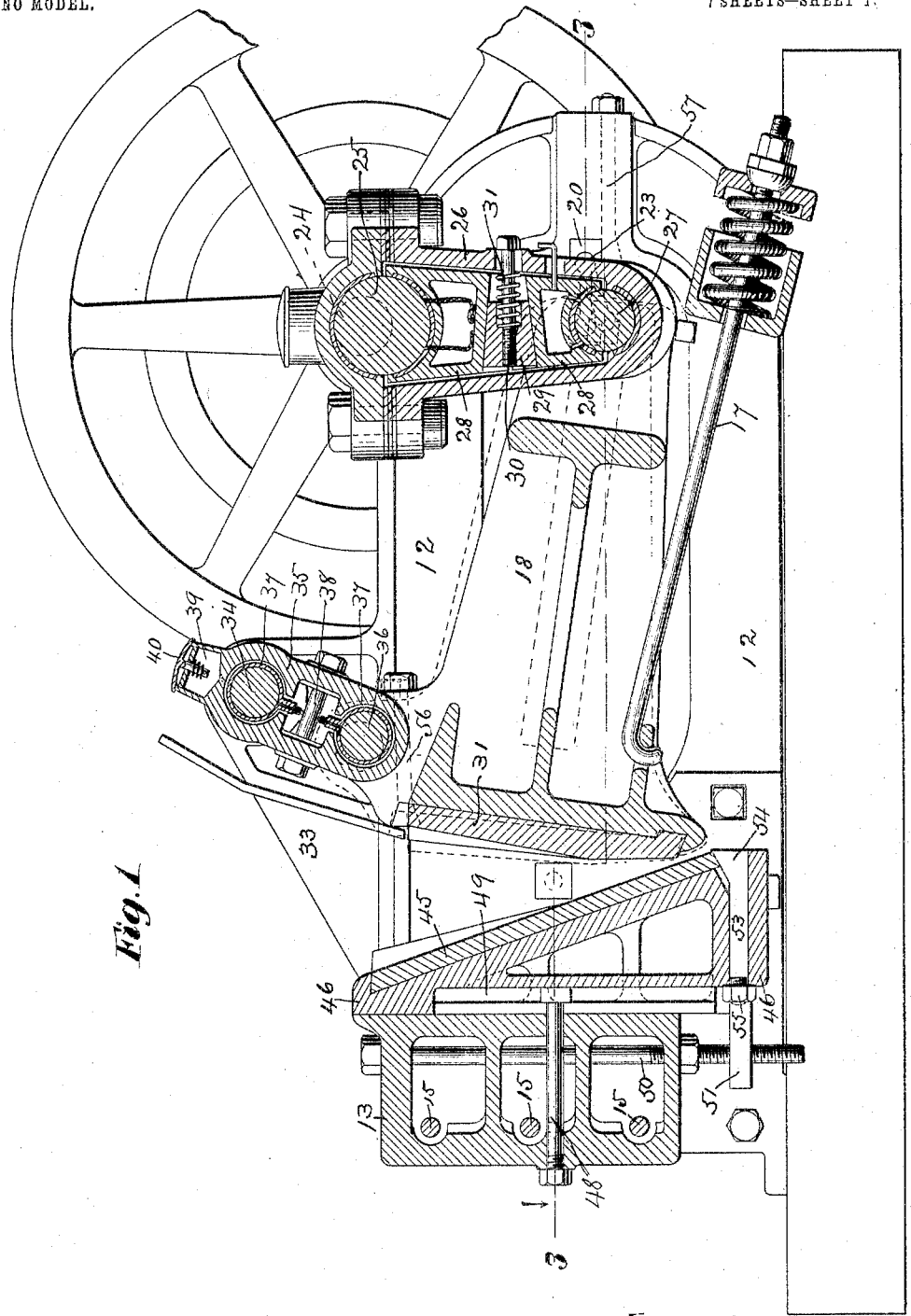
Figure 2:
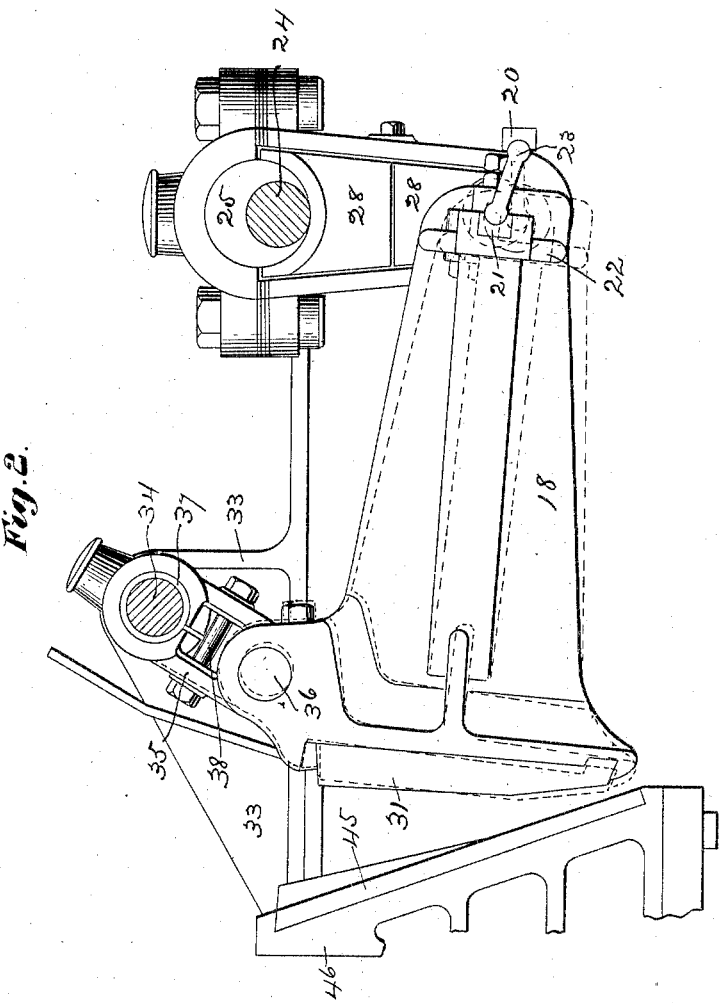
Figure 3:
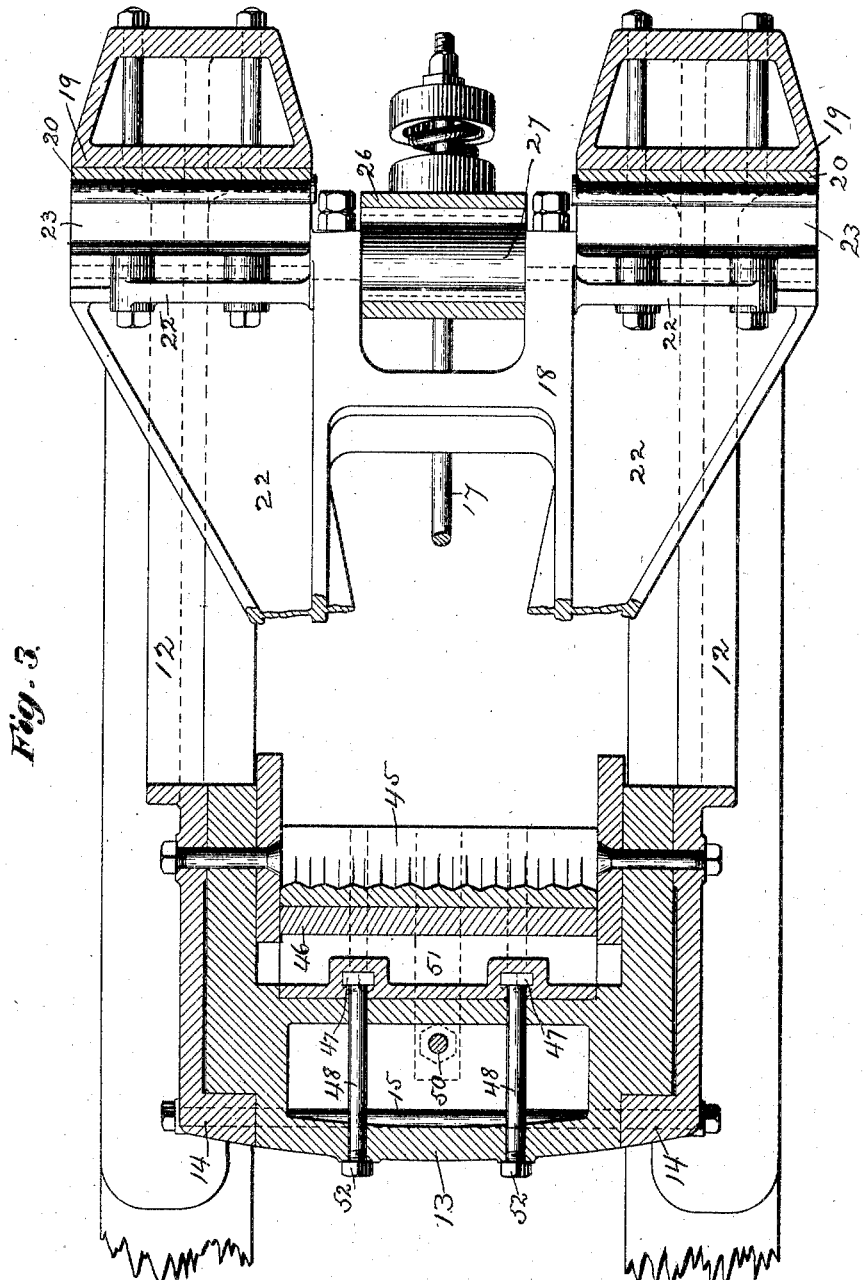
Figure 6:
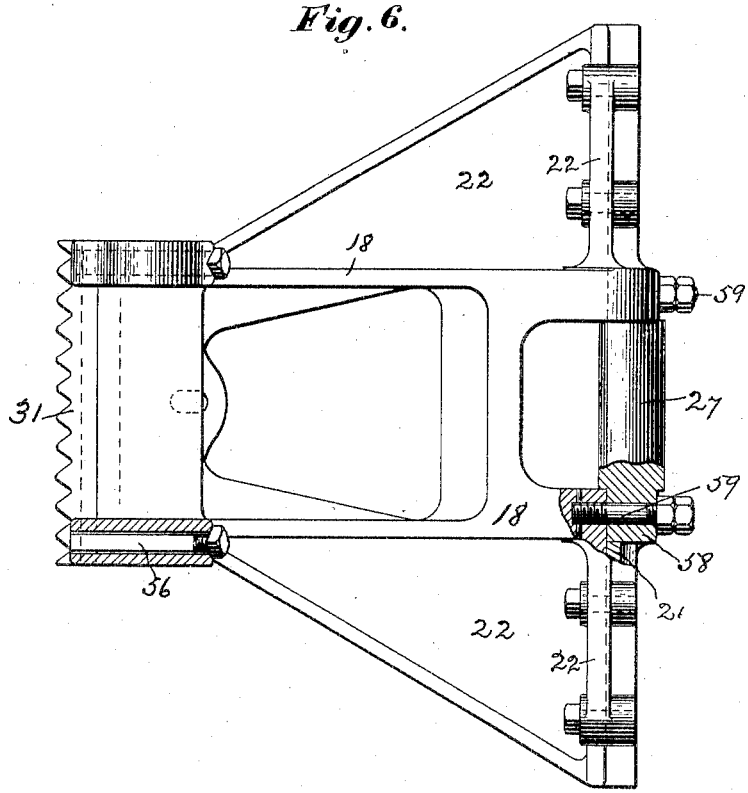
Figure 7:
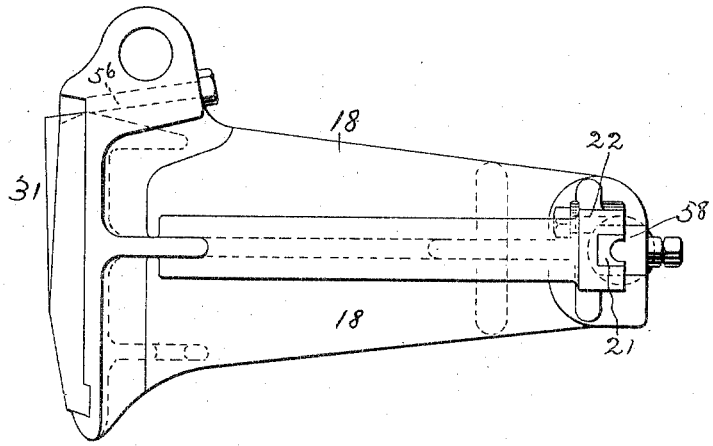
Figure 8:
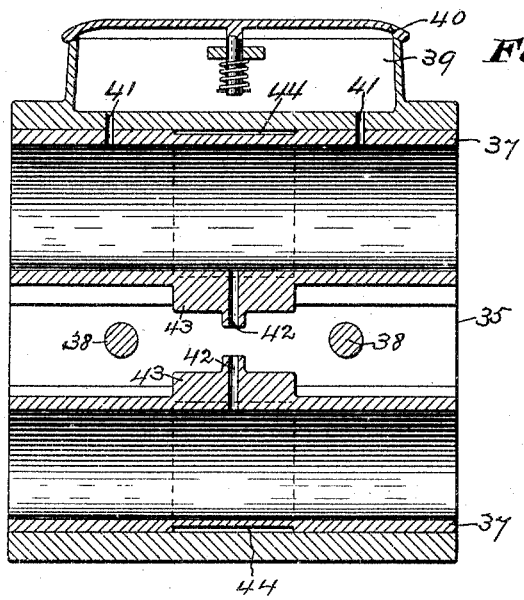
Figure 9:
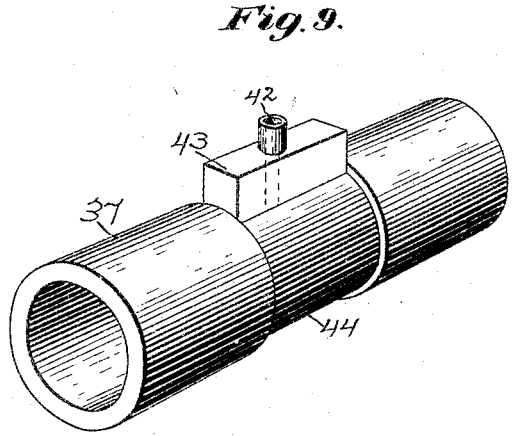
Figure 10:
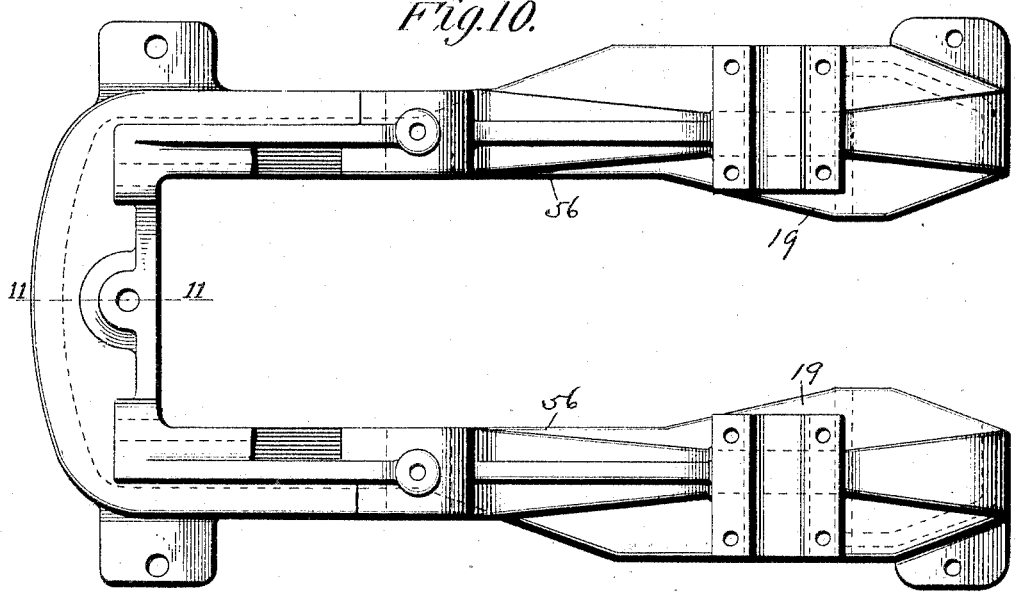
Figure 11:
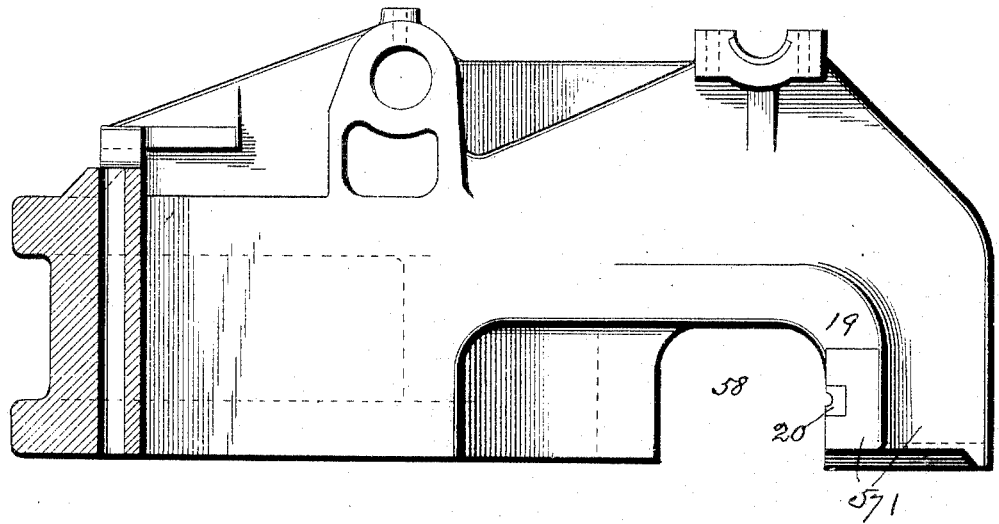

In the accompanying drawings, Figure 1 is vertical section of a crushing-machine embodying the present invention. Fig. 2 is a sectional side view showing more particularly the rocking-jaw frame and means for supporting and operating the same. Fig. 3 is a horizontal section of the frame of the machine on line 3 3, Fig. 1, with the rocking-jaw frame partly broken away. Fig. 4 is a central cross-section of the frame of the machine looking toward the right, Figs. 1 and 3. Fig. 5 is a detail side view of the pitman with the pitman-pin and operating-eccentric in section. Fig. 6 is a detail plan view of the rocking-jaw frame with parts in horizontal section, and Fig. 7 is a detail side view of the said rocking-jaw frame. Fig. 8 is a detail sectional view of the supporting-link, and Fig. 9 a detail perspective view of one of the bushings used in connection therewith. Fig. 10 is a plan view of a U-shaped machine-frame made solid or cast in one piece; and Fig. 11 is a central vertical section of the same on line 11 11, Fig. 10.

The frame of the present machine is U-shaped and is preferably of cast-steel for strength and lightness and may comprise side plates or pieces 12 and a head-block 13, the said side pieces and head-block forming collectively a frame which is U-shaped horizontally and open at its rear end without necessitating a cross-block at its rear end. The head-block 13 is recessed in front for the reception of inwardly-extending hooks 14, formed on the side pieces, the said side pieces and head-block being strongly secured together by cross-bolts 15, providing a rigid U-shaped frame, the rear ends of the side plates being connected only by the cross-bar 16, which supports the spring-pressed steadying-rod 17 for the rocking-jaw frame 18. The side pieces of the U-shaped frame are preferably made partly open to allow convenient access to the mechanism inclosed between them, and each of the said side pieces is provided with an abutment or buttress 19, which receives a toggle-seat 20 and between which and the toggle-seats 21, supported in wings or lateral projections 22 of the rocking-jaw frame 18, are interposed the toggles 23, formed as webs of considerable length, so as to have extended bearings in the toggle-seats, supported by the abutments or buttresses of the side pieces and the wings of the rocking-jaw frame.

The rocking-jaw frame 18 is operated from a shaft 24, provided with the usual fly and pulley wheels and with an operating-eccentric 25, embraced by a yoke at the upper end of a pitman 26, the lower end of said pitman engaging a pin 27, secured to the rear end of the said rocking-jaw frame. The pitman 26 comprises two bearing-blocks 28, abutting, respectively, against the eccentric 25 and the pitman-pin 27, and interposed between the said bearing-blocks is an adjusting-wedge 29, engaged by a screw-bolt 30, the said screw-bolt being encircled by a spiral spring 31, having a tendency to force the wedge toward the forward end of the machine and against the stress of which spring the wedge 29 is drawn in forcing the bearing-blocks toward the said eccentric and pitman-pin in securing proper bearings for the eccentric and pin and in taking up wear. It will be observed that by means of the wedge 29 a very nice and accurate adjustment of the bearings in the pitman may be secured and maintained at all times.

The rocking-jaw frame 18 may be hung in such a manner that the jaw 31, carried thereby, will have a crushing operation only on the upward movement of said frame, as indicated by dotted lines in Fig. 1, or said jaw-frame may be so hung as to effect a crushing operation when moving both up and down, as indicated in dotted lines in Fig. 2. These somewhat different operations will be secured either by mounting the said jaw-frame in such a manner that the forward ends of the toggles will rock on both sides of or both above and below a horizontal line extending forward from the central bearing-points of the said toggles in the stationary toggle-seats 20 for producing the operation indicated by dotted lines in Fig. 2, or by hanging the said jaw-frame in such a manner that the toggles will rock only on one side of or only above or below a line extending horizontally forward from the central bearings of the toggles in the toggle-seats 20 in the stationary frame to produce the mode of operation denoted by dotted lines in Fig. 1. The somewhat different modes of operation may be produced by lengthening or shortening the pitman, and this may be effected by inserting a greater or lesser number of shims 32 between the upper and lower parts of the pitman-yoke, as denoted in Fig. 5, the wedge 29 being correspondingly adjusted to provide for varying the positions of the bearing-blocks 28, between which it is interposed.

The rocking-jaw frame 18 is supported at its forward end from the side plates or parts 12 of the machine-frame, such support being provided for in the present instance by the standards 33 on the said side plates or parts and which standards receive the ends of a pin 34, passing through the upper end of a web-formed link 35, the lower end of which is jointed to the upper part of the said rocking-jaw frame by a second pin 36. Each of said pins are preferably encircled by a bushing 37, of bronze or other suitable bearing material, such as is shown in detail in Figs. 8 and 9, and the central part of said web-link is split or formed open, so that said link may be compressed when desired, by means of one or more cross-bolts 38, to simultaneously compress it upon both the top and bottom bearings of the said link. To provide for proper lubrication, the link 35 is preferably provided at its top with an oil-chamber 39, having a spring-pressed cover 40, said oil-chamber communicating, by means of suitable oil-ducts 41, with the bearing of the pin 37 and thence through suitable oil-ducts 42 in the sleeves 37 with the bearing of the pin 36, said oil-ducts 42 being formed in lugs or projections 43, with which the said sleeves are provided, and the said sleeves being grooved annularly at their central portions to provide spaces 44 to aid in the collection and distribution of the lubricating-oil. The recesses or spaces 44 afford pockets to receive a quantity of oil which is slowly distributed in the working of the machine to the joints to be lubricated.

The stationary or fixed jaw or jaw-plate 45 is mounted on a vertically-adjustable wedge 46, supported on the head-block 13 and steadied and guided in its vertical adjustment by means of heads 47 at the inner ends of bolts 48, passing through said head-blocks, said heads entering vertical grooves 49 in said wedge. The said wedge is adjustable vertically by means of a screw-bolt 50, tapped in a part of said head-block and in a lug or arm 51, with which the said wedge is provided, and the said wedge is locked in any desired position of adjustment by tightening the nuts 52, with which the steadying and clamping bolts 48 are provided. The fixed jaw or jaw-plate 45 is preferably secured to the wedge 46 by one or more bolts or slides 53, provided with wedge portions 54, engaging the lower edge of the said jaw-plate and having nuts 55, which may be tightened to clamp the said jaw-plate securely in place on the said wedge. The rocking jaw or jaw-plate 31 is similarly attached to the rocking-jaw frame by means of bolts or slides 56, having wedge portions and clamping-nuts, and the stationary toggle-seats 20 are also preferably secured in the side frames 12 by means of slides or bolts 57, similar to the slides or bolts 53 and having similar wedge portions and clamping-nuts. To secure the toggle-seats 20 in place, the nuts with which the bolts 57 are provided are tightened, thus causing the wedge portions on the lower faces of the said bolts to force the upper faces of the inner ends of said bolts into strong frictional engagement with the said toggle-seats, and thus clamp them in place in their sustaining-abutments on the side frames 12.

The fixed jaw-plate 45, vertically movable with the adjusting-wedge 46, is of greater vertical length than the rocking jaw-plate 31, so that as the said wedge is adjusted vertically to cause the fixed jaw-plate to be moved toward or from the rocking jaw-plate to vary the working distance between said jaws or jaw-plates, and thus regulate the degree of fineness of the material being crushed, different portions of the said fixed or normally stationary jaw-plate will be brought into the positions near the lower end of said jaw-plate, where the most wear is likely to occur, and thereby provide for distribution of the wear in such a manner that the said vertically-adjustable jaw-plate will last much longer than it otherwise would. This is an important advantage in that it greatly prolongs the working life of the said jaw or jaw-plate, the frequent renewal of which might otherwise involve considerable expense.

The pitman-pin 27 is provided with square end portions 58, received in open rectangular recesses or grooves in the extreme end of the rocking-jaw frame 18, said pin being secured in place by screw-bolts 59 passing through the said squared end portions of said pin. The recesses or grooves in the rear end of the rocking-jaw frame, receiving the squared ends of the pitman-pin, are central with the somewhat smaller recesses or grooves which receive the toggle-seats 21, this construction contributing toward a saving of expense in milling the rocking-jaw frame to provide suitable grooves for the reception of the toggle-seats 21 and the squared ends of the pitman-pin.

From the foregoing it will be apparent that the improved constructions herein shown and described provide a rolling or rocking jaw crushing-machine having many advantages in cheapness of construction, efficiency, and durability over similar crushing-machines heretofore in use. It is sometimes very important in machines of this class, which of necessity are somewhat ponderous, that the parts should be as light as possible consistent with efficiency and should also be capable of being dismounted from each other, so that when it is necessary, as frequently occurs, for the machines to be transported over mountainous paths or roads the different disassembled parts thereof may be handled as easily as possible, and this is an end which we have aimed to secure in the construction of our present improved machine. By making the frame of the machine and other parts thereof, as the rocking-jaw frame, of cast-steel the greatest possible lightness consistent with proper strength is secured.

Instead of making the U-shaped frame of our machine of side pieces and a head-block bolted together, as shown in Fig. 3, the horizontally-U-shaped frame may consist of a single integral casting with the arms or side parts and the head-block integral, as represented in Fig. 10, and such construction of frame may be either of cast-steel or cast-iron. The arms or side parts 56 of this integral U-shaped frame will preferably be widened at their rear parts, as are the arms or side pieces of the sectional U-shaped frame, to afford proper extended abutments or buttresses 19 for the toggles backing the rocking-jaw frame, the rear toggle-seats 20 being mounted in depending projections 571 at the rear ends of the side parts or arms of the frame and formed by providing the lower faces of said side parts or arms with recesses 58, which receive the side arms of the rocking-jaw frame and afford a convenient construction for assembling the parts of the machine. This U-shaped frame, made either solid or in sections, is lighter and cheaper to make than the forms of frames heretofore employed in this class of crushers. The stationary jaw will be mounted at the cross-piece or head-block end of the integral frame, the same or substantially the same as with the sectional frame.

Having thus described our invention, we claim and desire to secure by Letters Patent—

1. In a rocking-jaw crushing-machine, the combination with a U-shaped machine-frame open at its rear end and having side parts provided with projections to form buttresses for toggles, of a fixed or normally stationary jaw mounted in said frame, a coöperating rocking jaw, a rocking-jaw frame also mounted in said machine-frame and carrying said rocking jaw, toggles interposed between the rear parts of said rocking-jaw frame and the said buttresses of said machine-frame, and means for operating said rocking-jaw frame.

2. In a rocking-jaw crushing-machine, the combination with a U-shaped machine-frame open at its rear end and composed of side parts and a head-block all integral, of a fixed or normally stationary jaw mounted in said frame, a rocking jaw, a rocking-jaw frame carrying said rocking jaw, toggles interposed between the rear parts of said rocking-jaw frame and the side parts of said machine-frame and means for raising or lowering the working position of the pivoted rear end of said rocking-jaw frame, so that it may have a crushing action when moving in both directions, or on both the up-and-down or forward-and-backward strokes, or so that it may have a crushing action only when moving in one direction.

3. In a rocking-jaw crushing-machine, the combination with a fixed jaw mounted in a suitable frame, of a rocking-jaw frame, a rocking jaw carried thereby, toggles backing the said rocking-jaw frame against the frame of the machine, a rotating driving-shaft, an eccentric on said shaft, and a pitman and pitman-pin connecting said eccentric with the rear end of said rocking-jaw frame, said pitman being adjustable in length so that the working position of the said rocking-jaw frame may be varied, when desired, to cause the rocking jaw to have a crushing action either in one direction of movement only, or when moving in both directions.

4. In a rocking-jaw crushing-machine, the combination with a U-shaped machine-frame open at its rear end and comprising a head-block and side pieces all integral, said side pieces being provided with buttresses or abutments, of a fixed jaw mounted in said machine-frame, a rocking-jaw frame carrying a rocking jaw and provided with side wings or projections, and toggles interposed between said side wings or projections on said rocking-jaw frame and the said buttresses or abutments on said side pieces; so that the said buttresses or abutments receive and oppose the entire crushing strain on the rocking jaw, in the operation of the machine.

5. In a rocking-jaw crushing-machine, the combination with a fixed jaw mounted in a suitable frame, of a rocking-jaw frame, a rocking jaw carried thereby, toggles backing the said rocking-jaw frame against the frame of the machine, a rotating driving-shaft, an eccentric on said shaft, and a pitman connecting said eccentric with said rocking-jaw frame, a pitman-pin having square end portions secured in open rectangular recesses in the extreme rear end of the said rocking-jaw frame, said pitman-pin affording a jointed connection between the lower end of the said pitman and the said rocking-jaw frame.

6. In a rocking-jaw crushing-machine, the combination with a U-shaped frame comprising side parts or arms and a head-block, of a fixed jaw mounted in said frame, a rocking-jaw frame, a rocking-jaw carried thereby, means for operating the said rocking-jaw frame, a link and pivot-pins which serve to movably support the forward end of the said rocking-jaw frame on the side parts of the machine-frame, said link being in the form of a web which is split or open at its middle portion, and one or more clamping-bolts by which the split or open portion of the said link may be compressed to simultaneously contract both bearings at the two pivotal points of the said link.

7. In a rocking-jaw crushing-machine, the combination with a U-shaped frame open at its rear end and comprising side parts and a head-block, of a fixed jaw mounted in said frame, a rocking-jaw frame, a rocking jaw carried thereby, toggles interposed between the rear parts of said rocking-jaw frame and the side parts of said U-shaped frame, means for operating the said rocking-jaw frame, a link and pivot-pins which serve to movably support the forward end of the said rocking-jaw frame on the side parts of the machine-frame, and bushings surrounding said pivot-pins.

8. In a rocking-jaw crushing-machine, the combination with a frame comprising side parts and a head-block, of a fixed jaw mounted in said frame, a rocking-jaw frame, a rocking jaw carried thereby, means for operating the said rocking-jaw frame, a link which serves as a movable support for the forward end of the said rocking-jaw frame on the side parts of the machine, pins pivotally joining said link with the machine-frame and with the rocking-jaw frame, respectively, bushings surrounding said pins, said link being in the form of a web which is split or open in its middle portion, and one or more clamping-bolts by which the split or open portion of the said link may be compressed to simultaneously contract both pivotal points of the said link at the said bushings.

9. In a rocking-jaw crushing-machine, the combination with a suitable machine-frame, of a fixed jaw mounted in said frame, a rocking-jaw frame, a rocking jaw carried thereby, means for operating the said rocking-jaw frame, a link and pivot-pins which serve to movably support the forward end of the said rocking-jaw frame on the said machine-frame, and annularly grooved sleeves or bushings surrounding the said pivot-pins, said link having a lubricant-chamber in its top and being provided with ducts whereby the lubricant in said chamber can pass to the pivotal bearings of the said link, and to the inclosed oil-chambers afforded by the grooves in said sleeves or bushings.

10. In a rocking-jaw crushing-machine, the combination with a suitable machine-frame, of a rocking-jaw frame mounted in the said machine-frame and provided with a rocking jaw, means for operating said rocking-jaw frame, a wedge mounted for vertical adjustment on the machine-frame, means for effecting a screw adjustment of said wedge vertically, and an independent and normally stationary jaw-plate carried by and vertically movable with said wedge.

11. In a rocking-jaw crushing-machine, the combination with a suitable machine-frame, of a rocking-jaw frame mounted in the said machine-frame and provided with a rocking jaw, means for operating said rocking-jaw frame, a wedge mounted for vertical adjustment on the said machine-frame, and an independent and normally stationary jaw-plate carried by and vertically movable with said wedge, said stationary jaw-plate being of greater vertical length than the rocking jaw so that different parts of the said normally stationary jaw may be presented to the point of greatest wear by adjusting it vertically with said wedge.

12. In a rocking-jaw crushing-machine, the combination with a suitable machine-frame, of a rocking-jaw frame mounted in the said machine-frame and provided with a rocking jaw, means for operating said rocking-jaw frame, a wedge mounted for vertical adjustment on the machine-frame and provided with a lug, a screw on the head-block, tapped in said lug, for adjusting said wedge vertically, and an independent and normally stationary jaw-plate carried by and vertically movable with said wedge.

13. In a rocking-jaw crushing-machine, the combination with a suitable machine-frame, of a rocking-jaw frame mounted in the said machine-frame and provided with a rocking jaw, means for operating said rocking-jaw frame, a wedge mounted for vertical adjustment on the said machine-frame, and provided with a lug, a screw on the head-block, tapped in said lug, for effecting vertical adjustment of said wedge, and an independent and normally stationary jaw-plate carried and vertically movable with said wedge, said stationary jaw-plate being of greater vertical length than the rocking jaw so that different parts of the said normally stationary jaw may be presented to the point of greatest wear by adjusting it vertically with said wedge.

In testimony whereof we affix our signatures in presence of two witnesses.

THOMAS L. STURTEVANT.
THOMAS JOSEPH STURTEVANT.

Witnesses:
W. H. ELLIS,
M. F. FOURNIER.